United States Patent [19]

Rief et al.

[11] Patent Number: 5,554,277
[45] Date of Patent: Sep. 10, 1996

[54] IN-LINE LEAF TRAP

[76] Inventors: Dieter J. Rief, 2780 Bardy Rd., Santa Rosa, Calif. 95405; Herman E. Frentzel, Frentzel Engineering, 424 Bee St., Sausalito, Calif. 94965

[21] Appl. No.: 462,205

[22] Filed: Jun. 5, 1995

[51] Int. Cl.6 .............. B01D 35/05; E04H 4/16
[52] U.S. Cl. .............. 210/94; 210/169; 210/232; 210/237; 210/242.1; 210/305; 210/436; 210/448; 210/456
[58] Field of Search .............. 210/94, 169, 232, 210/237, 242.1, 305, 320, 416.2, 436, 446, 448, 456

[56] References Cited

U.S. PATENT DOCUMENTS

| | | | |
|---|---|---|---|
| 3,928,202 | 12/1975 | Raubenheimer | 210/169 |
| 4,105,557 | 8/1978 | Weatherholt | 210/169 |
| 4,328,101 | 5/1982 | Broden | 210/320 |
| 4,476,021 | 10/1984 | Souza | 210/320 |
| 4,493,717 | 1/1985 | Berger, Jr. et al. | 210/448 |
| 4,718,129 | 1/1988 | Miller | 210/169 |
| 4,959,146 | 9/1990 | Kristan | 210/169 |
| 4,988,437 | 1/1991 | Gefter et al. | |
| 5,100,541 | 3/1992 | Kallenbach | 210/448 |
| 5,269,913 | 12/1993 | Atkins | 210/436 |
| 5,308,483 | 5/1994 | Sklar et al. | 210/446 |
| 5,338,446 | 8/1994 | Schuman et al. | 210/169 |

OTHER PUBLICATIONS

Leaflet entitled *Baracuda The World's Simplest Automatic Pool Cleaners*, Baracuda International Corp., Nov. 1994.

*Primary Examiner*—Peter A. Hruskoci
*Assistant Examiner*—Theodore M. Green
*Attorney, Agent, or Firm*—Douglas E. White; Acronational Law Firm

[57] ABSTRACT

An in-line leaf trap captures the leaves and debris that are gathered by a manual or automatic suction-type swimming pool cleaner before they can enter the swimming pool's water filtering system. The leaf trap is placed in-line with the flexible hose that conducts the leaves and debris between the pool cleaner and the poolside suction connection. The in-line leaf trap is a two-piece closed container having inside a removable or integrated perforated or mesh screen debris basket. The body of the trap has two cylindrical tapered openings to mate with commonly used swimming pool cleaner hoses. The openings are oriented to ensure proper flow direction through the trap. The device floats in the pool with its top section just above the water line. The flexible hose is held floating just under the top surface of the water. By the use of flotation and ballast materials, the trap maintains a vertical operating position, with its body seal held below the water line, after being placed in that position by the pool owner or maintainer. The transparent material used in making the in-line leaf trap permits one to see when the basket is filled. Preferably, the lower body, with the attached or integral basket, is separated from the upper body and the leaves and debris are dumped out and disposed. The unit is then rejoined for further use in the pool cleaning system.

16 Claims, 4 Drawing Sheets

IN-LINE LEAF TRAP

FIELD OF THE INVENTION

This invention relates to a device which automatically collects for disposal leaves and other debris that have been gathered by a manual or automatic suction-type swimming pool cleaner before the leaves or other debris can enter the poolside suction connection which leads to the pool's water filter system.

BACKGROUND OF THE INVENTION

Suction-type manual and automatic swimming pool cleaners, of which there are many on the market, collect leaves, dirt and other debris from the bottom and sides of swimming pools by means of a flexible swimming pool cleaner hose. These foreign materials are carried by the water through the hose. The water and foreign materials are drawn by the suction side of the filter pump to the filter. Most pool pumps have an integral hair and lint trap on the suction side of the pump to prevent damage to the pump. As the pumps are often remote from the pool site, and the hair and lint traps are difficult to clean out, the pool owner or maintainer frequently ignores or does not know that the hair and lint trap is filled. Thus the efficiency of the pump falls and, consequently, the efficiency and effectiveness of the pool's entire cleaning system falls.

There are several in-line leaf traps on the market today. Examples are those manufactured by Rainbow Lifeguard Products, by Arneson Products, Inc. (see U.S. Pat. No. 4,988,437) and by Barracuda International Corp. All of these devices do work. However, they leak air (thereby losing suction), they are difficult to open and they are opaque or detract from the appearance of the pool surface. Therefore, present in-line leaf traps do not fully address the pool owner's needs.

SUMMARY OF THE INVENTION

The present invention is an in-line leaf trap which collects leaves, dirt and other debris when used in conjunction with the use of a manual or automatic swimming pool cleaner. It readily mates into the standard flexible swimming pool cleaner hose which leads from the cleaner to the poolside suction connection. It has an internal mesh basket that is easily removed for debris disposal. All, or a substantial portion, of the device is made of transparent material so that the extent of remaining capacity can be seen. "Transparent material", as the term is used herein, includes translucent material.

Air leakage is not a problem, insofar as the simple sealing surface is always held beneath the water level. An internal air bleed hole in the device prevents the in-line leaf trap from broaching, should air somehow enter the pool's cleaning and filter system.

FEATURES AND ADVANTAGES

A feature of this invention is the provision of an in-line leaf trap apparatus for use in collecting foreign matter that has been picked up by a manual or automatic suction-type swimming pool cleaner. The trap body assembly is hollow and has separable upper and lower bodies with a perforated or mesh collection basket contained inside the hollow. The upper body part contains means for adapting tire body assembly in-line with the swimming pool cleaner hose.

Another feature is that tire inner portion of the upper body of the leaf trap has baffles to direct water contaminated with leaves and other debris through the basket for collection, allowing strained water to pass freely from the trap.

Still another feature is a bleed hole in an uppermost interior part of the upper body which permits any entrapped air to escape directly into the swimming pool cleaner hose.

A further feature of this invention is the provision of an interior configuration and basket arrangement that allows for maximum debris collection and minimum suction pressure loss.

A preferred feature is the configuration of the upper body having the inlet and outlet ports being in-line and in a plane with the swimming pool cleaner hose and with or below the pool's water surface.

Yet another feature of the invention is that the adapting means includes inlet and outlet ports having a male end on the upper body, the male end insertable into a first portion of hose, and a female end on the upper body—a second portion of the hose insertable into the female end.

Another feature is a simple face (or "lip") seal, comprising means for mating the two body halves together, which seal does not have the requirement of being absolutely air and water tight, owing to its location beneath the pool surface when in use.

A preferred feature of the invention is the use of integrally molded snap-clips or interrupted bayonet joints to join the upper and lower bodies.

Another Feature is the use of transparent material in the body to permit the viewing of the interior of the in-line leaf trap to see the status of debris collection.

An additional feature is the use of materials with various pre-selected specific gravities to ensure proper floatation of the device to minimize the use of additional ballast or floatation. Such materials comprise means for maintaining the seal entirely below the water line.

A further feature is the attachment of the basket of the trap to the lower body thereof, to facilitate manufacturing and to simplify the emptying of the basket.

Another ligature of the invention is use of a handle to aid in the manipulation and cleaning of the device.

A yet further feature of the invention that it consists of only three parts. With more complex tooling, it could be made of only two molded parts.

It is an object of this invention to provide a device of inexpensive construction and manufacture that is simple and effective in operation. The device described herein can be installed quickly and easily.

A further object of the invention is to provide a device whose components can be quickly and readily replaced, if necessary. The present device will not readily wear out. A yet further object or feature of the invention is the provision of a device that will not corrode through electrolysis, nor otherwise fail in chemically treated pool water.

Other novel features which are characteristic of the invention, as to organization and method of operation, together with further objects and advantages thereof will be better understood from the following description considered in connection with the accompanying drawing, in which a preferred embodiment of the invention is illustrated by way of example. It is to be expressly understood, however, that the drawing is for illustration and description only and is not intended as a definition of the limits of the invention.

Certain terminology and derivations thereof may be used in the following description for convenience in reference only, and will not be limiting. For example, words such as "upwardly," "downwardly," "leftward," and "rightward" would refer to directions in the drawings to which reference is made unless otherwise stated. Similarly, words such as "inwardly" and "outwardly" would refer to directions toward and away from, respectively, the geometric center of a device or area and designated parts thereof. References in the singular tense include the plural, and vice versa, unless otherwise noted.

Figure 1:
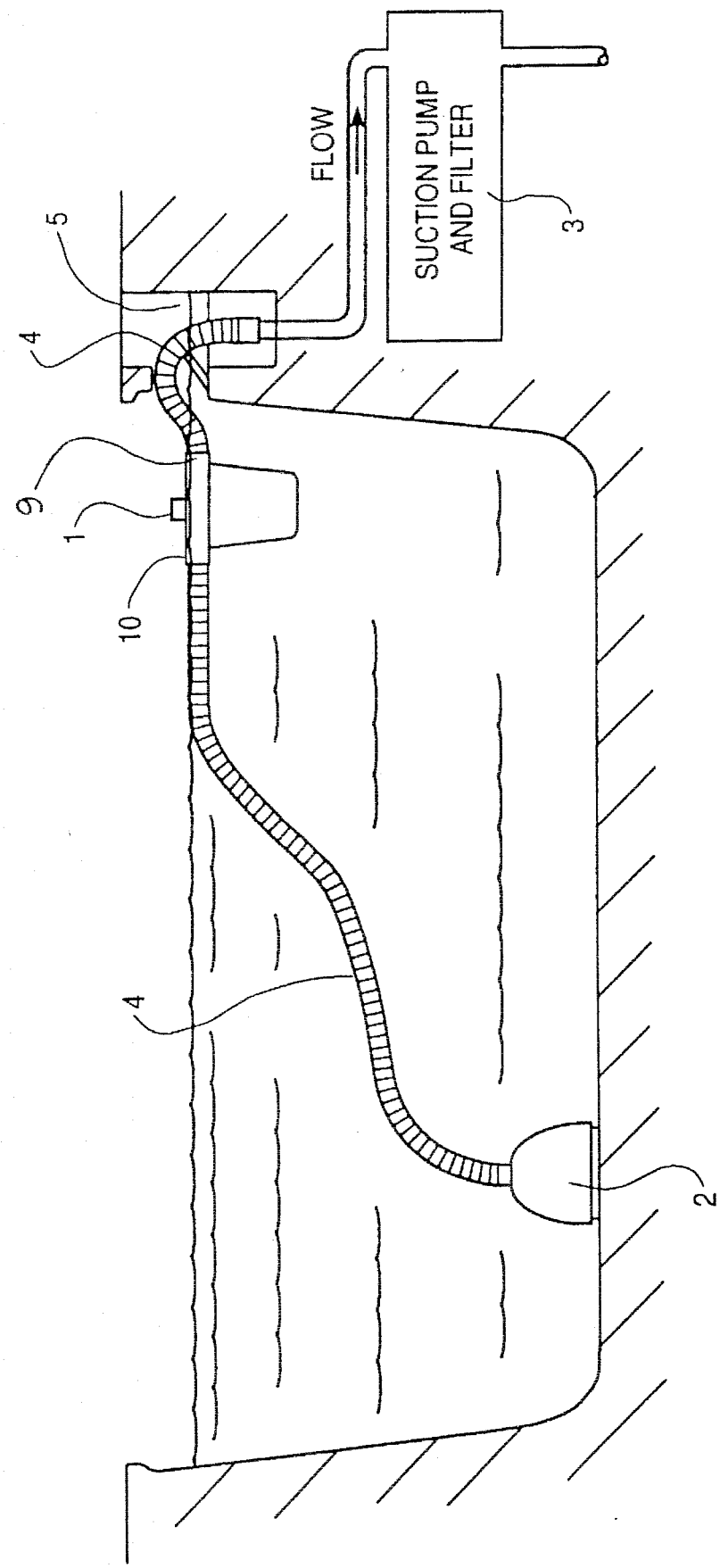
FIG. 1 is a cutaway view of a typical swimming pool, showing the leaf trap of this invention in its normal installation environment, namely, in-line with a flexible swimming pool cleaner hose, which hose links a pool cleaner and a pool filter system.

DRAWING REFERENCE NUMERALS 1 leaf trap
2 pool cleaner
3 pump and filter system
4 swimming pool cleaner hose
5 skimmer
6 upper body
7 handle
8 snap-clip recess
9 male hose connection
10 female hose connection
11 seal
12 basket
13 perforations
14 lip
15 opening
16 lower body
17 seal
18 snap-clip
19 interior baffle
20 chamber
21 exterior baffle
22 bleed hole
23 post
24 assembly
25 gussets
26 body assembly

DESCRIPTION OF A PREFERRED EMBODIMENT

Referring to FIG. 1, there is illustrated therein a preferred in-line leaf trap 1 of this invention. Trap 1 is in installed a typical swimming pool. It is connected in-line with a flexible swimming pool cleaner hose 4, which hose links a pool cleaner 2 and a suction pump and filter system 3 of conventional construction (illustrated schematically). As shown in FIG. 1, the hose 4 may run through the skimmer 5 of the pool. Water is pulled by suction of the pump and filter system 3 from the cleaner 2, through the trap 1, and through the suction pump and filter system 3. The filtered pool water is then returned to the pool.

Figure 2:
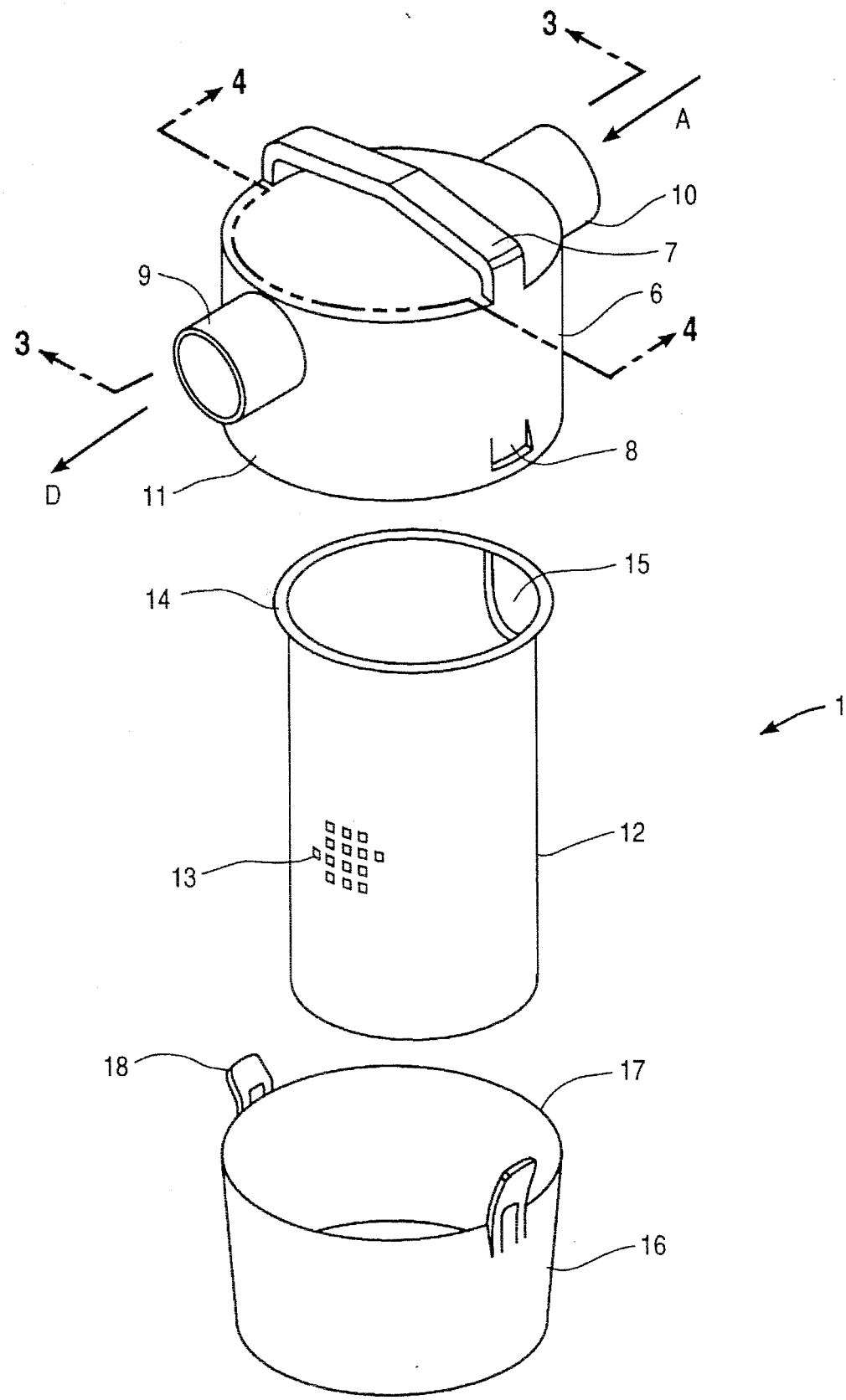
FIG. 2 is an exploded perspective view of the in-line leaf trap of FIG. 1.

FIG. 2 illustrates the three components of the in-line leaf trap 1, namely, the upper body 6, the basket 12, and the lower body 16. The upper body 6 consists of a lifting handle 7, a pair of connecting snap-clip recesses 8, a male hose port or connection end 9 on the outlet side, a female hose port or connection end 10 on the inlet side, and a peripheral face seal 11. The seal comprises a lip formed about the bottom circumferential edge of the upper body 6. Together, the upper body 6 and the lower body 16 form a hollow body assembly 26.

The basket 12 is an open-top container that has a more or less continuous mesh of perforations 13 (schematically illustrated only partially in FIGS. 2–4) formed through virtually all side and bottom surfaces. These perforations are holes on the order of about ⅛ inch square (or other suitable open shape). The perforations 13 can be bigger or smaller, depending upon market needs. The top opening of the basket 12 has a flat horizontal lip 14 projecting radially outward with which to facilitate the seating thereof and the control of water flow in the trap 1. On the upper end of the basket 12 there is a port or opening 15 which provides an unobstructed entrance for debris-laden water into the basket 12.

The lower body 16 is of a pot-like configuration, having an upper peripheral face seal 17, the seal comprising a lip that mates with the bottom face or lip seal 11 of the upper body 6. The two lips or face seals, when mated, hereinafter collectively may be referred to in the singular as the "seal". A mutually opposed pair of interrupted bayonet joints or snap-clips 18 on the lower body 16 engage the congruently-profiled snap-clip recesses 8 on the upper body 6. The clips 18 keep the upper body 6 and the lower body 16 together, with the basket 12 trapped inside. Either the upper body 6 or the lower body 16 (preferably, at least the upper body) may be made partially or entirely of transparent or translucent plastic, as well as the basket 12.

Figure 3:
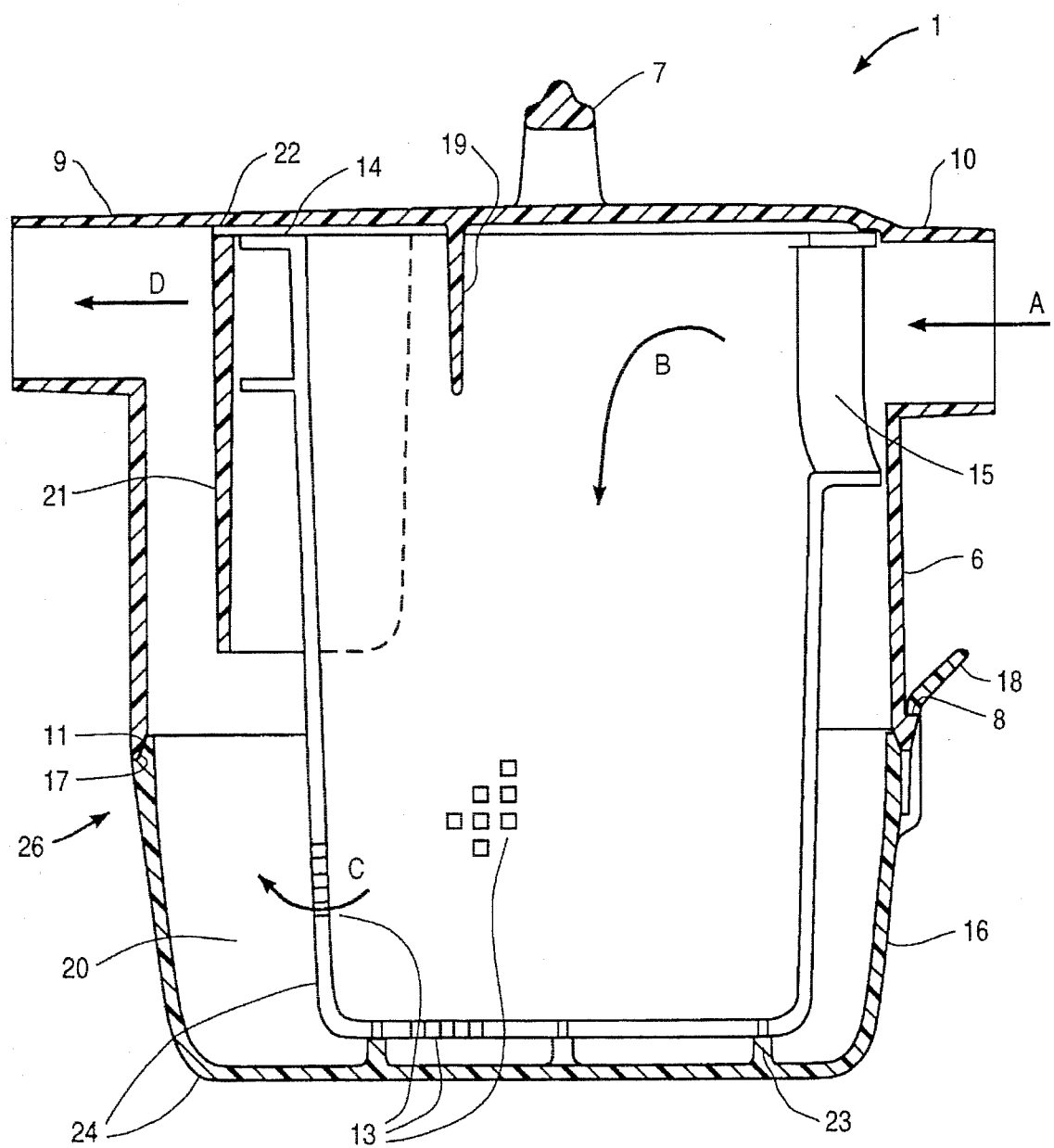
FIG. 3 is a longitudinal cross-section of the in-line leaf trap of FIG. 1, taken through its centerline axis along line 3—3 of FIG. 2.

FIG. 3 illustrates the flow of water entering the inlet opening 10 (arrow A) from the hose 4 (FIG. 1). From there it passes through the interior of the basket 12 (arrow B), having entered through the basket opening 15. Thereafter, the water is diverted by the interior baffle 19. The leaves and other debris (not illustrated) become trapped within the interior of the basket 12 by the limited size of the perforations 13 (partially illustrated schematically). However, the thus-strained water continues freely to travel on through the perforations 13 (arrow C) into the outer body chamber 20 surrounding the basket 12—drawn by the suction forces of the pump system 3. The strained pool water then flows out of the exit port or opening 9 (arrow D) into the hose 4 and on to the pool suction pump and filter system 3.

A second "exterior" (with relation to the basket 12) baffle 21 prevents the short circuiting of the water through only the told of the basket 12. The exterior baffle 21 produces a proper distribution of debris in the basket 12 for maximum collection ability.

One snap-clip 18 is shown in FIG. 3 engaged in a snap-clip recess 8. The upper seal 11 contacts the lower seal 17 in a self-guiding and self-sealing manner. Note that the simple lip-seal and snap-clip combination is functionally adequate in this novel combination, insofar as said seal remains below the water line during normal operation of the apparatus 1. Therefore, there is no risk of air bleeding through the seal, which bleeding can be a problem in prior art devices—resulting in the loss of suction pressure.

A bleed hole 22 allows any entrapped air to pass through the trap 1 and continue on into the hose 4. Posts 23 tie the lower body 16 to the basket 12 to simplify the evacuation of debris from the basket 12. Together, the basket and lower body form an assembly 24. Note that the basket 12 either can be made to snap on and off the posts 23, or it could be glued or otherwise permanently bonded to them. In the latter case, during clean out of the trap 1 the entire assembly 24 would be unclipped from the upper body 6, tipped over, and shaken or flushed clean.

The snap-clips 18 and snap-clip recesses 8 are oriented to ensure that the basket opening 15 always becomes aligned with the female hose connection 10 in the upper body 6 when the in-line leaf trap 1 is reassembled after cleaning.

Figure 4:
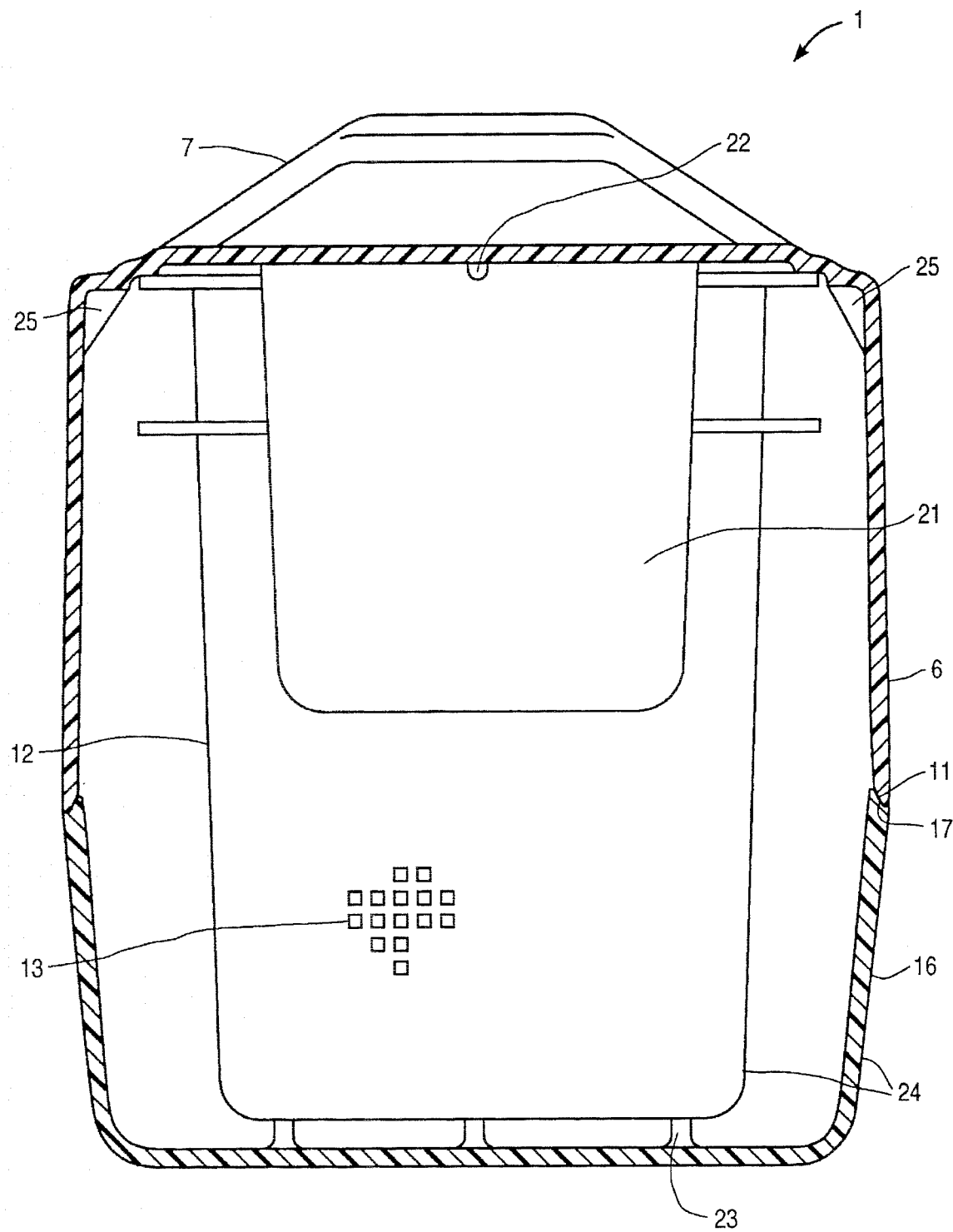
FIG. 4 is a cross-sectional view taken at a right angle to the view of FIG. 3, generally along line 4—4 of FIG. 2.

FIG. 4 illustrates gussets 25 which guide the assembly 24 into position upon reassembly of the trap 1. By taking reference to FIGS. 1, 3, and 4, it can be seen that the air bleed hole 22 is oriented at the centermost and highest point in the water flow path through the in-line leaf trap 1, thus assuring prompt venting of entrapped air from the interior of the top of the basket 12 to the outer chamber 20 and directly out the port 9, which air entrapment otherwise might interfere with the proper operation of the apparatus 1.

With the proper selection of component densities of the upper body 6, the lower body 16, and the basket 12, and perhaps through the addition of strategically placed ballast weights or floats (not illustrated), the apparatus 1 is forced always to float, in normal operation, with the waterline plane at the top of the apparatus (i.e., passing through or above the vicinity of the bleed hole 22 and the ports 9 and 10). This places the seal 17 well below the water surface, out of danger of broaching, as previously noted. Therefore, the seal 17 may be of less complexity than previously found in the art, i.e., the need for O-ring seals and the like is eliminated.

While the above provides a full and complete disclosure of the preferred embodiments of this invention, various modifications, alternative constructions, and equivalents may be employed without departing from the true spirit and scope of the invention. Such changes might involve alternative materials, components, structural arrangements, sizes, operational features or the like. For example, the exterior baffle plate 21 might be replaced with a correspondingly shaped and positioned imperforate baffle portion formed directly in the wall of the otherwise foraminiferous basket 12. Therefore, the above description and illustrations should not be construed as limiting the scope of the invention, which is defined by the appended claims.

What is claimed is:

1. Leaf trap apparatus for use in combination with a swimming pool filter system joined in fluid communication with a suction-type automatic pool cleaner by a swimming pool cleaner hose in a pool having a water line, including:

an rigid upper body;

a lower body;

means for mating the upper and lower bodies together to form a face seal, the apparatus having no O-ring or other seal;

a body assembly foraged by the upper and lower bodies, the body assembly having an exterior and a hollow interior;

an open mesh basket in the hollow interior;

means for adapting the body assembly in line with the swimming pool cleaner hose; and means for maintaining the seal entirely below the water line.

2. The apparatus of claim 1 wherein:

at least a portion of the body assembly is transparent.

3. The apparatus of claim 2 wherein:

the adapting means includes
a male end on the upper body, the male end insertable into a first portion of the hose; and
a female end on the upper body, a second portion of the hose insertable into the female end.

4. The apparatus of claim 3 further including:

at least one water directing and deflecting baffle formed in the hollow interior and depending downwardly from an inner top of the upper body.

5. The apparatus of claim 4 further including:

a bleed hole in at least one baffle, the bleed hole formed in a plane passing through the male and female ends.

6. The apparatus of claim 4 wherein:

at least a portion of the body assembly is transparent or translucent; the basket has a circumferential wall; and
there are two baffles, a first baffle depending downwardly interior to the basket wall and a second baffle depending downwardly exterior to the basket wall.

7. The apparatus of claim 3 wherein:

the maintaining means includes materials in the body assembly having pre-selected specific gravities to insure positioning of the male and female ends at or below the water line, the seal being formed below the ends.

8. The apparatus of claim 3 wherein:

the mating means includes
at least one snap-clip on one of the upper and lower bodies; and
at least one snap-clip recess on the other of the upper and lower bodies.

9. The apparatus of claim 8 wherein:

the seal is a face seal comprising solely
a first circumferential lip on a lower edge of the upper body; and
a second circumferential lip on an upper edge of the lower body which mates in flush contact with the first lip.

10. In combination with a swimming pool filter system joined in fluid communication with a suction-type automatic pool cleaner by a swimming pool cleaner hose in a pool having a water line, in-line leaf trap apparatus including:

a first portion of the hose;

a second portion of the hose;

an upper rigid molded-plastic body;

a lower rigid molded-plastic body;

means for mating the upper and lower bodies together to form a face seal, the apparatus having no O-ring or other seal;

a body assembly formed by the upper and lower bodies, the body assembly having an exterior and a hollow interior, a substantial portion of the body assembly being transparent or translucent;

an open male end on the body assembly, the male end insertable into the first portion of the hose;

an open female end on the body assembly which is larger than the male end, the second portion of the hose insertable into the female end;

an open mesh basket in the hollow interior, the basket having an enlarged opening disposed in fluid communication with one of the open ends; and at least one downwardly depending water-flow diversion baffle passing perpendicularly through a plane that passes axially though the open ends,
  wherein all pans of the in-line leaf trap apparatus are made of rigid plastic.

11. The apparatus of claim 10 further including:
a first fiat circumferential lip on the bottom of the upper body;
a second flat circumferential lip on the top of the lower body; and
snap-clips releasably mating the lips together to form a face seal without an O-ring.

12. The apparatus of claim 11 further including:
materials in the body assembly having pre-selected specific gravities to ensure positioning of the male and female ends at the water line, the seal being formed below the ends.

13. The apparatus of claim 12 wherein:
the basket has a circumferential wall; and
there are two baffles, a first baffle depending downwardly interior to the basket wall and a second baffle depending downwardly exterior to the basket wall, the second baffle having a bleed hole formed in a plane passing through the male and female ends.

14. The apparatus of claim 13 further including:
a lifting handle on the body assembly;
gussets in the hollow interior of the body assembly for guiding the basket into place within the hollow interior; and
posts tying the lower body to the basket.

15. In an in-line leaf trap apparatus having means to trap leaves, of the type connected to a swimming pool cleaner hose in a pool having a water line, the apparatus having inlet and outlet ports attached to the hose, the improvement comprising:
a two-part body assembly, a substantial portion of which body assembly is transparent;
a face seal in the body assembly having no O-ring or other seal, the face seal joining the two parts of the body assembly; and
means for maintaining the seal below the water line.

16. The apparatus of claim 15 further including:
at least one bleed hole for evacuating air from the body assembly, the at least one bleed hole and the inlet and outlet ports sharing a common plane.

* * * * *